(12) United States Patent
Wada

(10) Patent No.: US 11,530,768 B2
(45) Date of Patent: Dec. 20, 2022

(54) PIPE COUPLING HAVING VALVE ELEMENT AND COIL SPRING FOR USE THEREIN

(71) Applicant: NITTO KOHKI CO., LTD., Tokyo (JP)

(72) Inventor: Akihiro Wada, Tokyo (JP)

(73) Assignee: NITTO KOHKI CO., LTD., Tokyo (JP)

(*) Notice: Subject to any disclaimer, the term of this patent is extended or adjusted under 35 U.S.C. 154(b) by 0 days.

(21) Appl. No.: 17/393,947

(22) Filed: Aug. 4, 2021

(65) Prior Publication Data
US 2021/0364113 A1 Nov. 25, 2021

Related U.S. Application Data

(63) Continuation of application No. PCT/JP2020/001638, filed on Jan. 20, 2020.

(30) Foreign Application Priority Data

Feb. 4, 2019 (JP) .............................. JP2019-017615

(51) Int. Cl.
*F16L 37/32* (2006.01)
*F16F 1/06* (2006.01)
(Continued)

(52) U.S. Cl.
CPC ................. *F16L 37/32* (2013.01); *F16F 1/06* (2013.01); *F16F 1/122* (2013.01); *F16L 37/46* (2013.01);
(Continued)

(58) Field of Classification Search
CPC ......... F16L 37/32; F16L 37/413; F16L 37/23; F16F 1/06; F16F 1/122; F16F 1/12;
(Continued)

(56) References Cited

U.S. PATENT DOCUMENTS 485,652 A * 11/1892 Pfingst ...................... F16F 1/06
29/896.91
3,500,859 A * 3/1970 Pearson .................. F16L 37/32
251/149.8

(Continued)

FOREIGN PATENT DOCUMENTS

JP S55055461 4/1980
JP 2001310729 11/2001
(Continued)

OTHER PUBLICATIONS

International Search Report for International Application PCT/JP2020/001638, dated Mar. 10, 2020.

*Primary Examiner* — David Colon-Morales
(74) *Attorney, Agent, or Firm* — Burris Law, PLLC

(57) ABSTRACT

A coil spring is disposed in a fluid passage between a cylindrical body and a valve element to urge the valve element toward a closed position. The coil spring comprises a valve support portion supporting the valve element, a secured portion secured to an inner peripheral surface of the fluid passage, an expanding-contracting portion extending from the secured portion, and a connecting portion between the expanding-contracting portion and the valve support portion. The connecting portion comprises a first portion curved so as to pass radially outward of an end winding portion of the expanding-contracting portion, a second portion passing through the center of the valve support portion, a third portion extending curvedly so as to overlap the first portion, and a fourth portion extending to the valve support portion. When the coil spring is compressed, the valve support portion is supported to the expanding-contracting portion 54 through the connecting portion.

7 Claims, 3 Drawing Sheets

(51) Int. Cl.
  *F16L 37/46* (2006.01)
  *F16F 1/12* (2006.01)
  *F16L 37/23* (2006.01)
  *F16L 37/22* (2006.01)
  *F16K 15/02* (2006.01)

(52) U.S. Cl.
  CPC .... *F16K 15/026* (2013.01); *F16K 2200/3053* (2021.08); *F16L 37/22* (2013.01); *F16L 37/23* (2013.01)

(58) Field of Classification Search
  CPC ........ F16F 1/04; F16K 15/026; F16K 15/025; F16K 2200/3053; F16K 2200/305
  See application file for complete search history.

(56) References Cited

U.S. PATENT DOCUMENTS

| | | | | |
|---|---|---|---|---|
| 3,788,348 | A * | 1/1974 | Johnson | F16L 37/23 137/614.04 |
| 3,961,645 | A * | 6/1976 | Kagan | F16L 37/40 251/149.6 |
| 4,313,594 | A * | 2/1982 | Antoniw | F16L 37/23 251/357 |
| 4,582,347 | A * | 4/1986 | Wilcox | F16L 37/00 439/348 |
| 7,921,875 | B2 * | 4/2011 | Moriiki | F16L 37/32 137/614.04 |
| 9,297,373 | B2 * | 3/2016 | Bagagli | F16K 17/044 |
| 10,711,905 | B2 * | 7/2020 | Gresset | F16F 1/08 |
| 10,746,148 | B2 * | 8/2020 | Zankl | F16J 15/3452 |
| 11,105,453 | B2 * | 8/2021 | Imoto | F16L 37/28 |
| 2019/0024835 | A1 * | 1/2019 | Imoto | F16L 37/34 |
| 2020/0247378 | A1 * | 8/2020 | Suzuki | B60T 13/57 |
| 2020/0256415 | A1 * | 8/2020 | Chan | H01M 50/296 |

FOREIGN PATENT DOCUMENTS

| | | | |
|---|---|---|---|
| JP | 2009108979 | 5/2009 | |
| JP | 2016017620 | 2/2016 | |
| WO | 2017175832 | 10/2017 | |
| WO | WO-2017175832 A1 * | 10/2017 | ........... F16K 15/025 |

\* cited by examiner

PIPE COUPLING HAVING VALVE ELEMENT AND COIL SPRING FOR USE THEREIN

CROSS-REFERENCE TO RELATED APPLICATIONS

This application is a continuation of International Application No. PCT/JP2020/001638, filed on Jan. 20, 2020, which claims priority to and the benefit of Japanese Patent Application No. 2019-017615, filed on Feb. 4, 2019. The disclosures of the above applications are incorporated herein by reference.

FIELD

The present disclosure relates to a pipe coupling configured to open and close a fluid passage by a valve element, and also relates to a coil spring for use in the pipe coupling to urge the valve element toward a closed position.

BACKGROUND

A pipe coupling of the type described above usually comprises a male coupling member and a female coupling member which are detachably connectable to each other, and is configured such that when the male and female coupling members are connected together, a valve element provided in the male coupling member is pressed to an open position by the female coupling member, thereby allowing fluid to flow through the pipe coupling. Specifically, the male coupling member has a valve element and a coil spring in a fluid passage, and the coil spring urges the valve element so that the valve element is pressed against a valve seat provided on the peripheral wall of the fluid passage to close the fluid passage. Meanwhile, the female coupling member has a valve element pressing portion and is configured to press the valve element to an open position by the valve element pressing portion when the male and female coupling members are connected together. In this type of pipe coupling, when the fluid flows from the female coupling member side toward the male coupling member side with the valve element being in the open position, the valve element is subjected to a fluid pressure toward the coil spring side. As the fluid pressure applied to the valve element increases, the valve element is displaced while further compressing the coil spring. At this time, if the load applied to the coil spring becomes excessively high, the coil spring may be plastically deformed, for example, which may make it impossible to properly urge the valve element to the closed position when the pipe coupling is disconnected.

To solve the above-described problem, International Publication WO 2017/175832, for example, discloses a coil spring having a connecting portion provided between a valve support portion and an expanding-contracting portion thereof so that the valve support portion is supported to the expanding-contracting portion through the connecting portion. Specifically, the connecting portion is configured as follows. As seen in the direction of the longitudinal axis of the coil spring, the connecting portion curvedly extends from the expanding-contracting portion so as to overlap the expanding-contracting portion, and rectilinearly extends from the curved portion to overlap the valve support portion, and further curvedly extends to overlap the expanding-contracting portion before reaching the valve support portion. Accordingly, when the coil spring is compressed, the valve support portion abuts against the rectilinear portion of the connecting portion, and the curved portions at the opposite sides of the rectilinear portion abut against the expanding-contracting portion, resulting in the valve support portion being supported to the expanding-contracting portion through the connecting portion.

When compressed, a coil spring usually expands slightly in the radial direction, resulting in an increase in the outer diameter. With the coil spring disclosed in the above-described Patent Literature 1, also, when the expanding-contracting portion is compressed, the outer diameter thereof increases, and if an excessive load acts on the coil spring in this state, the connecting portion may be undesirably pushed into the inside of the expanding-contracting portion enlarged in diameter. Once the connecting portion has been deformed into the inside of the expanding-contracting portion, the connecting portion may be caught in the expanding-contracting portion and become unable to return to the previous position, resulting in a failure to properly urge the valve element to the closed position when the pipe coupling is disconnected.

SUMMARY

Under these circumstances, an object of the present disclosure is to provide a coil spring configured such that a connecting portion between a valve support portion and an expanding-contracting portion is prevented from being deformed into the inside of the expanding-contracting portion even when a high load is applied thereto, even more reliably, and to also provide a valved flow path member and a pipe coupling which are configured to urge a valve element by a coil spring configured as stated above.

That is, the present disclosure provides a coil spring configured to be disposed in a fluid passage to urge a valve element disposed in the fluid passage displaceably in the direction of a longitudinal axis of the fluid passage from an open position for opening the fluid passage toward a closed position for closing the fluid passage. The coil spring includes the following: a valve support portion configured to support the valve element; a secured portion configured to be secured to an inner peripheral surface of the fluid passage; an expanding-contracting portion extending from the secured portion toward the valve support portion, the expanding-contracting portion being wound a plurality of turns so as to expand and contract in the direction of the longitudinal axis when the valve element is displaced between the closed position and the open position; and a connecting portion extending between the valve support portion and an end winding portion of the expanding-contracting portion that is located at an end of the expanding-contracting portion closer to the valve support portion. The valve support portion has a support winding portion that is concentric with the expanding-contracting portion as seen in the direction of the longitudinal axis and is smaller in diameter than the expanding-contracting portion. The connecting portion has the following, as seen in the direction of the longitudinal axis: a first portion extending curvedly from the end winding portion so as to pass radially outward of the end winding portion while at least partially overlapping the end winding portion; a second portion extending contiguously from the first portion radially inward and passing through the valve support portion; a third portion extending contiguously from the second portion curvedly so as to overlap at least one of the end winding portion and the first portion; and a fourth portion extending contiguously from the third portion radially inward to the support winding portion of the valve support portion.

With the above-described coil spring, when the valve element is considerably displaced and hence the coil spring is greatly compressed between the secured portion and the valve support portion, the valve support portion is supported to the expanding-contracting portion through the connecting portion, which comprises the first to fourth portions. Specifically, the valve support portion is directly supported by the second portion, and the second portion is supported to the expanding-contracting portion by the first and third portions, which are located at the opposite sides of the second portion. Further, the first portion extends curvedly so as to pass radially outward of the end winding portion of the expanding-contracting portion. Therefore, it is possible to prevent the connecting portion from entering the inside of the expanding-contracting portion when the coil spring is greatly compressed, even more reliably than in the case of the above-described conventional coil spring. Thus, it is possible to prevent the coil spring from becoming unable to return to the previous configuration for urging the valve element to the closed position, which would otherwise occur when the valve support portion or the connecting portion is plastically deformed or caught in the expanding-contracting portion as a result of being considerably displaced to the inside of the expanding-contracting portion.

Specifically, the arrangement may be as follows. The expanding-contracting portion has a uniform-diameter portion wound a plurality of turns so as to have a substantially uniform outer diameter from the secured portion to the end winding portion along the longitudinal axis, and the end winding portion is wound so as to have an outer diameter smaller than that of the uniform-diameter portion and yet to at least partially overlap the uniform-diameter portion, as seen in the direction of the longitudinal axis.

Further, the first portion of the connecting portion may be curved so as to pass through substantially the same radial position as the uniform-diameter portion of the expanding-contracting portion as seen in the direction of the longitudinal axis.

Further, the second portion of the connecting portion may extend so as to radially traverse the valve support portion through the center of the support winding portion of the valve support portion as seen in the direction of the longitudinal axis.

The above-described arrangement makes it possible to support the valve support portion even more stably.

Further, the arrangement may be as follows. When the expanding-contracting portion is not compressed, the first portion abuts against the end winding portion of the expanding-contracting portion, and the second portion abuts against the support winding portion of the valve support portion, and further the third portion abuts against the at least one of the end winding portion and the first portion.

In addition, the present disclosure provides a valved flow path member including the following: a cylindrical body having a fluid passage; a valve element disposed in the fluid passage displaceably in the direction of a longitudinal axis of the fluid passage between an open position for opening the fluid passage and a closed position for closing the fluid passage; and the above-described coil spring disposed in the fluid passage between the cylindrical body and the valve element.

In addition, the present disclosure provides a pipe coupling including a male coupling member and a female coupling member which are connectable to each other, one of the male coupling member and the female coupling member being the above-described valved flow path member, wherein when the male coupling member and the female coupling member are connected to each other, the valve element is pressed into the open position by the other of the male coupling member and the female coupling member.

An embodiment of a pipe coupling according to the present disclosure will be explained below on the basis of the accompanying drawings.

DRAWINGS

In FIG. 5, however, an illustration of a secured portion is omitted.

In FIG. 6, however, an illustration of the secured portion is omitted.

DETAILED DESCRIPTION

Figure 1:
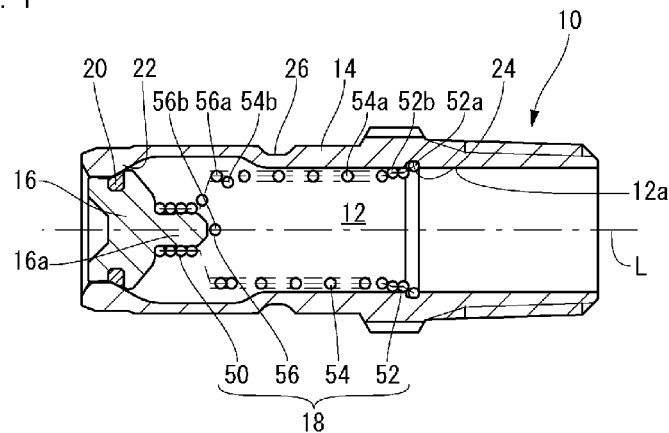
FIG. 1 is a sectional side view of a male coupling member of a pipe coupling according to an embodiment of the present disclosure.
Figure 2:
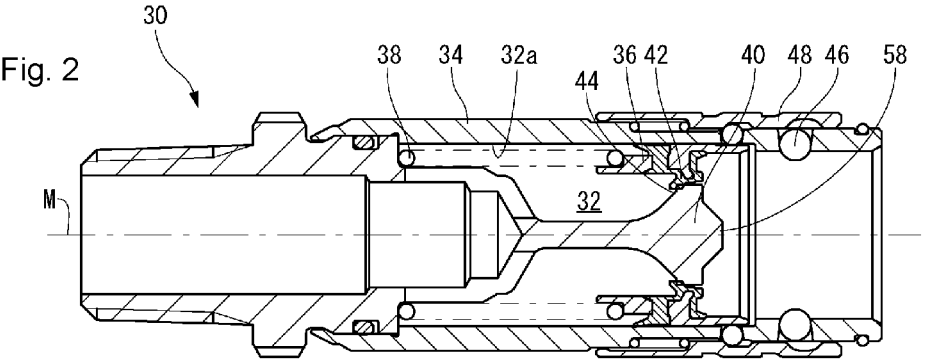
FIG. 2 is a sectional side view of a female coupling member of the pipe coupling according to the embodiment of the present disclosure.
Figure 3:
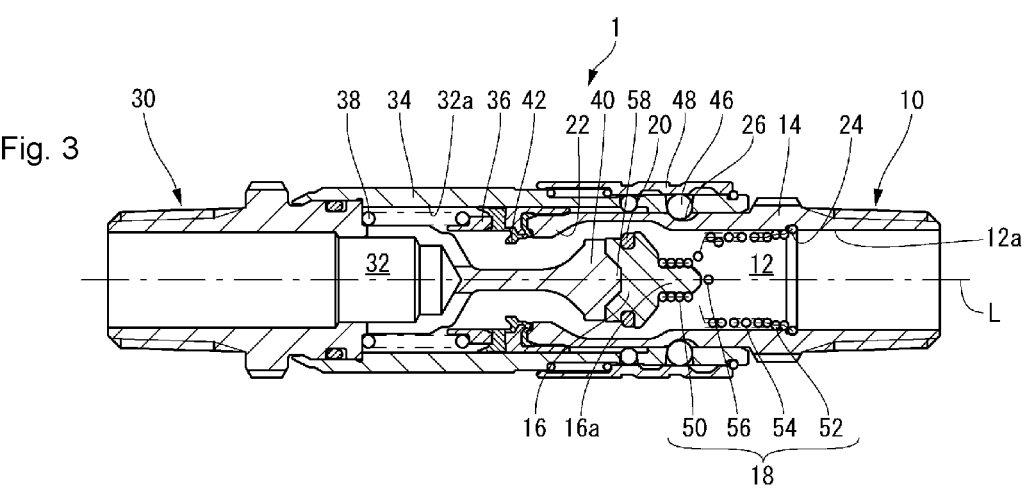
FIG. 3 is a sectional side view showing the way in which the male coupling member of FIG. 1 and the female coupling member of FIG. 2 are connected together.

A pipe coupling 1 according to an embodiment of the present disclosure comprises a male coupling member 10 (valved flow path member) shown in FIG. 1, and a female coupling member 30 shown in FIG. 2. The male coupling member 10 and the female coupling member 30 are detachably connectable to each other as shown in FIG. 3.

The male coupling member 10 includes a cylindrical body 14 having a fluid passage 12, a valve element 16 disposed in the fluid passage 12, and a coil spring 18 disposed in the fluid passage 12 between the cylindrical body 14 and the valve element 16. The valve element 16 is equipped with a rubber seal ring 20. The valve element 16 is displaceable between a closed position (FIG. 1) where the seal ring 20 sealingly engages a valve seat portion 22 of the cylindrical body 14 to close the fluid passage 12, and an open position (FIG. 3) where the valve element 16 retracts from the closed position in the direction of a longitudinal axis L of the fluid passage 12 (i.e. the valve element 16 is displaced rightward as seen in the figure) to open the fluid passage 12. The coil spring 18 urges the valve element 16 toward the closed position.

The female coupling member 30 includes a cylindrical body 34 having a fluid passage 32, a slide valve element 36 slidable along an inner peripheral surface 32a of the fluid passage 32, and a coil spring 38 urging the slide valve element 36. The cylindrical body 34 has a central portion 40 extending through the center of the fluid passage 32 in the direction of a longitudinal axis M. The central portion 40 is provided with a valve seat surface 44 sealingly engageable with a seal member 42 of the slide valve element 36. The coil spring 38 urges the slide valve element 36 so that the seal member 42 is pressed against the valve seat surface 44. Further, the female coupling member 30 includes a locking element 46 and a sleeve 48 for holding the male coupling member 10 in a connected state.

Figure 4:
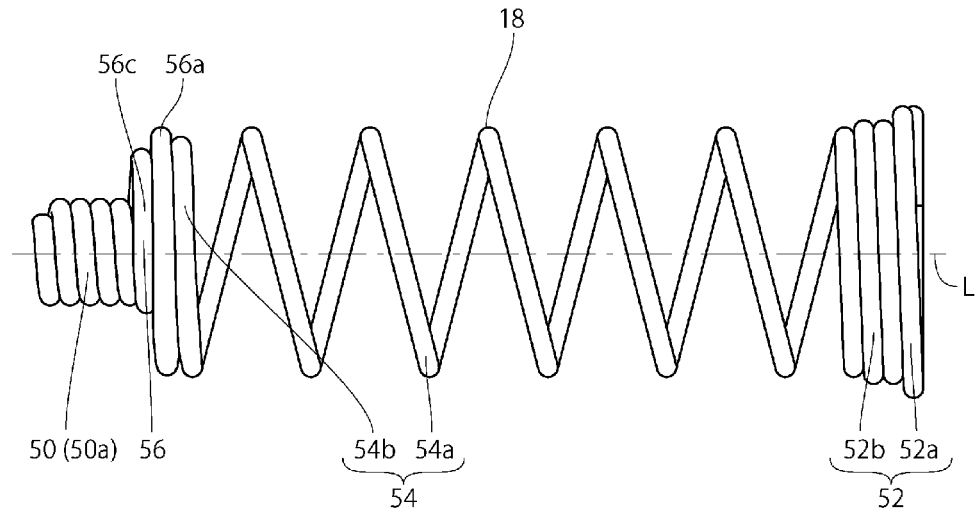
FIG. 4 is a side view of a coil spring used in the male coupling member shown in FIG. 1.
Figure 5:
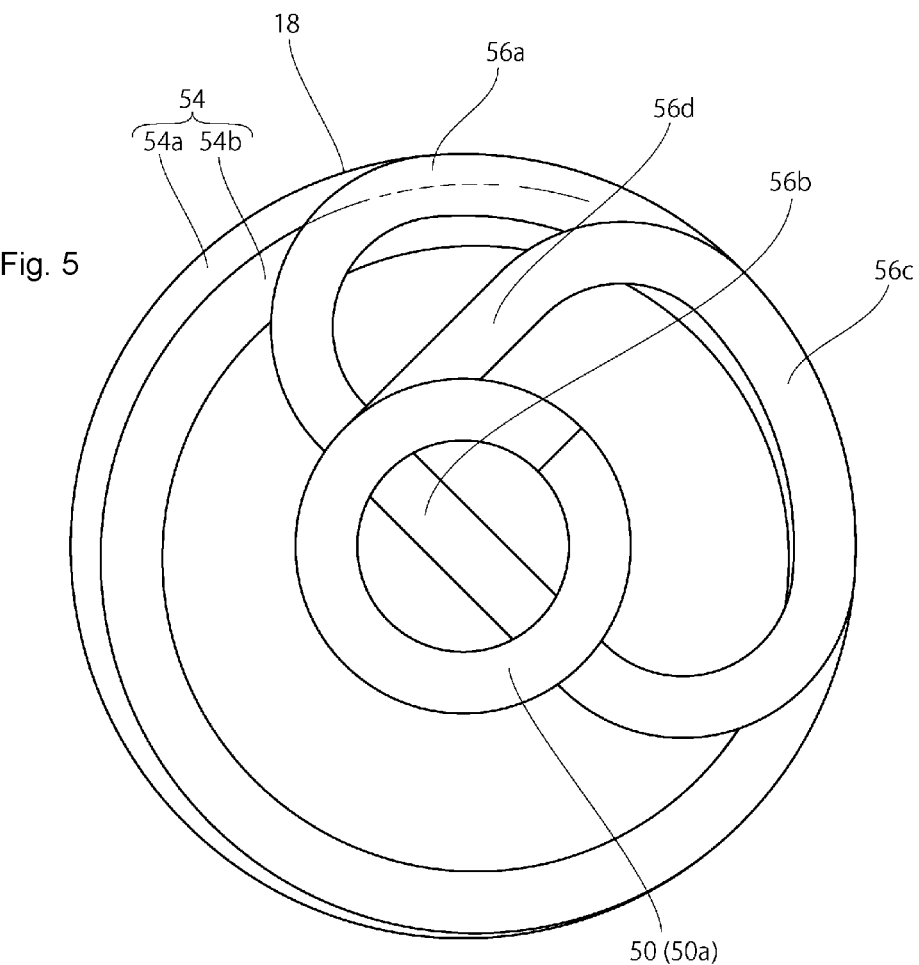
FIG. 5 is a front view of the coil spring shown in FIG. 4.
Figure 6:
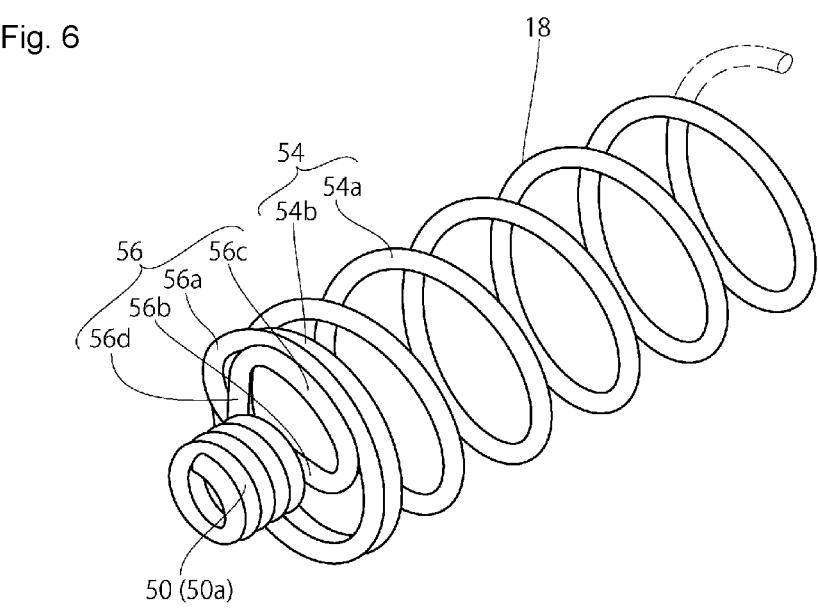
FIG. 6 is a perspective view of the coil spring shown in FIG. 4.

The coil spring 18 of the male coupling member 10 is, as shown in FIG. 4, formed by helically winding an elongated wire with circular cross-section a plurality of turns. The coil spring 18 has a valve support portion 50 supporting the valve element 16, a secured portion 52 secured to an inner peripheral surface 12a of the fluid passage 12, an expanding-contracting portion 54 extending from the secured portion 52 toward the valve support portion 50, and a connecting portion 56 extending between the expanding-contracting portion 54 and the valve support portion 50. The secured portion 52 has a fitting portion 52a formed by winding the wire approximately one turn, and a retaining portion 52b contiguous with the fitting portion 52a. The retaining portion 52b is formed by winding the wire approximately two turns so that the retaining portion 52b has a somewhat smaller diameter than that of the fitting portion 52a and is adjacent to the fitting portion 52a in the direction of the longitudinal axis L. The expanding-contracting portion 54 is contiguous with the retaining portion 52b. The expanding-contracting portion 54 is formed by winding the wire approximately six turns with spaces between adjacent turns in the direction of the longitudinal axis L. The expanding-contracting portion 54 has a slightly smaller diameter than that of the retaining portion 52b. More specifically, the expanding-contracting portion 54 comprises a uniform-diameter portion 54a extending from the retaining portion 52b and an end winding portion 54b located at an end of the expanding-contracting portion 54 closer to the valve support portion 50. The uniform-diameter portion 54a is wound approximately five turns along the longitudinal axis L so as to have a substantially uniform outer diameter, and the end winding portion 54b is wound approximately one turn so as to have a smaller outer diameter than that of the uniform-diameter portion 54a. The valve support portion 50 comprises a support winding portion 50a located concentrically with the expanding-contracting portion 54 and wound so as to have a smaller diameter than that of the expanding-contracting portion 54. The connecting portion 56 comprises, as shown in FIGS. 5 and 6, a first portion 56a, a second portion 56b, a third portion 56c, and a fourth portion 56d, which extend contiguously in sequence from the end winding portion 54b of the expanding-contracting portion 54 to the valve support portion 50. The first portion 56a, as seen in the direction of the longitudinal axis L, is curved so as to pass through the same radial position as the uniform-diameter portion 54a while partially overlapping the end winding portion 54b. As has been stated above, the end winding portion 54b has a smaller outer diameter than that of the uniform-diameter portion 54a. Therefore, the first portion 56a extends curvedly to pass radially outward of the end winding portion 54b. The second portion 56b extends contiguously from the first portion 56a rectilinearly radially inward and radially traverses the valve support portion 50 through the center of the support winding portion 50a of the valve support portion 50. The third portion 56c extends contiguously from the second portion 56b curvedly so as to overlap the first portion 56a. The fourth portion 56d extends contiguously from the third portion 56c rectilinearly radially inward to the valve support portion 50. When no load is applied to the coil spring 18 and hence the expanding-contracting portion 54 is not compressed, the first portion 56a abuts against the end winding portion 54b of the expanding-contracting portion 54, and the second portion 56b abuts against the valve support portion 50, and further the third portion 56c abuts against the first portion 56a. With the described configuration, the valve support portion 50 is supported to the expanding-contracting portion 54 through the connecting portion 56.

The cylindrical body 14 of the male coupling member 10 has a circular ring-shaped spring fitting groove 24 in the inner peripheral surface 12a of the fluid passage 12. The coil spring 18 is secured to the cylindrical body 14 by fitting the fitting portion 52a of the secured portion 52 into the spring fitting groove 24. The spring fitting groove 24 has a depth less than the diameter of the wire constituting the coil spring 18, so that when the fitting portion 52a is fitted into the spring fitting groove 24, a part of the fitting portion 52a always projects inward from the inner peripheral surface 12a of the fluid passage 12. Further, the retaining portion 52b of the secured portion 52 is in contact with the inner peripheral surface 12a of the fluid passage 12. Thus, the attitude of the coil spring 18 relative to the cylindrical body 14 is stabilized. The valve element 16 has a circular columnar spring support portion 16a projecting toward the coil spring 18 side in the direction of the longitudinal axis L. The valve element 16 is held by the coil spring 18, with the spring support portion 16a inserted in the valve support portion 50 of the coil spring 18. The expanding-contracting portion 54 of the coil spring 18 has an outer diameter smaller than the inner diameter of the fluid passage 12, so that a gap is formed between the expanding-contracting portion 54 and the inner peripheral surface 12a of the fluid passage 12.

As the male coupling member 10 is inserted into the female coupling member 30, as shown in FIG. 3, the slide valve element 36 of the female coupling member 30 is pressed leftward as seen in the figure by the cylindrical body 14 of the male coupling member 10. Consequently, the fluid passage 32 of the female coupling member 30 is opened. In addition, the valve element 16 of the male coupling member 10 is pressed rightward as seen in the figure to an open position by a valve element pressing portion 58 of the central portion 40 of the female coupling member 30. Thus, the fluid passage 12 of the male coupling member 10 is also opened. At this time, the locking element 46 of the female coupling member 30 is held from radially outside by the sleeve 48 in a state where the locking element 46 is engaged in a locking element engaging groove 26 of the male coupling member 10. Thus, the state is maintained where the male coupling member 10 and the female coupling member 30 are connected to each other.

When in the connected state shown in FIG. 3, the expanding-contracting portion 54 of the coil spring 18 is compressed in the direction of the longitudinal axis L by the displacement of the valve element 16 from the closed position to the open position. Meanwhile, the valve support portion 50 is supported by the second portion 56b of the connecting portion 56, and the second portion 56b is supported to the expanding-contracting portion 54 by the first portion 56a and the third portion 56c, which are located at the opposite sides of the second portion 56b. That is, the valve support portion 50 is supported to the expanding-contracting portion 54 through the connecting portion 56.

In the connected state, when fluid flows from the female coupling member 30 side toward the male coupling member 10 side, the pressure of the fluid acts on the valve element 16 in the downstream direction. When the fluid pressure increases in excess of the urging force of the coil spring 18, the valve element 16 is displaced while further compressing the expanding-contracting portion 54 of the coil spring 18. At this time, a high load is applied between the valve support portion 50 and the expanding-contracting portion 54; however, the valve support portion 50 is firmly supported by the connecting portion 56 having the above-described configuration, and therefore it is unlikely that the valve support portion 50 is displaced to the inside of the expanding-contracting portion 54. Specifically, the valve support portion 50 is supported by the second portion 56b, which passes through the center of the valve support portion 50, as seen in the direction of the longitudinal axis L. Therefore, it is unlikely that a force will act on the valve support portion 50 in a direction in which the valve support portion 50 is inclined relative to the longitudinal axis L. In addition, the second portion 56b, which supports the valve support portion 50 directly, is supported to the expanding-contracting portion 54 through the first portion 56a and the third portion 56c at the opposite ends thereof. Therefore, it is also unlikely that the second portion 56b will be undesirably inclined. Further, when the expanding-contracting portion 54 is compressed, the diameter thereof slightly increases. However, because the first portion 56a of the connecting portion 56 is curved so as to pass radially outward of the end winding portion 54b of the expanding-contracting portion 54, it is also unlikely that the first portion 56a will be displaced into the inside of the expanding-contracting portion 54 to a position beyond the end winding portion 54b. In other words, the coil spring 18 is configured such that even when an excessive force acts on the valve element 16, the valve support portion 50 is prevented from being displaced to the inside of the expanding-contracting portion 54, and the connecting portion 56, particularly the first portion 56a, is prevented from being displaced beyond the end winding portion 54b of the expanding-contracting portion 54, which might otherwise cause the connecting portion 56, particularly the first portion 56a, to be caught in the end winding portion 54b and to become unable to return to the previous position. Accordingly, the pipe coupling 1 using the coil spring 18 makes it possible to prevent the valve element 16 from becoming unable to return to the closed position when the pipe coupling 1 is disconnected after an excessive force has acted on the valve element 16, even more reliably than the conventional one.

Although an embodiment of the present disclosure has been described above, the present disclosure is not limited to the described embodiment. For example, the arrangement may be such that the whole expanding-contracting portion is wound so as to have a uniform diameter, and that the first portion of the connecting portion is curved so as to pass radially outward of the expanding-contracting portion. The third portion of the connecting portion may extend curvedly so as to overlap the end winding portion of the expanding-contracting portion instead of the first portion of the connecting portion, or may overlap both the end winding portion and the first portion. Further, the coil spring shown in FIGS. 4 to 6 may be used in a female coupling member and may also be used in a valved flow path member other than pipe couplings, such as a piping member having a check valve function, for example.

What is claimed is:

1. A coil spring configured to be disposed in a fluid passage to urge a valve element disposed in the fluid passage displaceably in a direction of a longitudinal axis of the fluid passage from an open position for opening the fluid passage toward a closed position for closing the fluid passage, the coil spring comprising:
   a valve support portion configured to support the valve element;
   a secured portion configured to be secured to an inner peripheral surface of the fluid passage;
   an expanding-contracting portion extending from the secured portion toward the valve support portion, the expanding-contracting portion being wound a plurality of turns so as to expand and contract in the direction of the longitudinal axis when the valve element is displaced between the closed position and the open position; and
   a connecting portion extending between the valve support portion and an end winding portion of the expanding-contracting portion that is located at an end of the expanding-contracting portion closer to the valve support portion;
   wherein the valve support portion has a support winding portion that is concentric with the expanding-contracting portion as seen in the direction of the longitudinal axis and is smaller in diameter than the expanding-contracting portion; and
   wherein the connecting portion has, as seen in the direction of the longitudinal axis:
      a first portion extending curvedly from the end winding portion so as to pass radially outward of the end winding portion while at least partially overlapping the end winding portion;
      a second portion extending contiguously from the first portion radially inward and passing through the valve support portion;
      a third portion extending contiguously from the second portion curvedly so as to overlap at least one of the end winding portion and the first portion; and
      a fourth portion extending contiguously from the third portion radially inward to the support winding portion of the valve support portion.

2. The coil spring of claim 1, wherein the expanding-contracting portion has a uniform-diameter portion wound a plurality of turns from the secured portion to the end winding portion along the longitudinal axis so as to have a substantially uniform outer diameter; and
   wherein the end winding portion is wound so as to have an outer diameter smaller than that of the uniform-diameter portion and yet to at least partially overlap the uniform-diameter portion, as seen in the direction of the longitudinal axis.

3. The coil spring of claim 2, wherein the first portion of the connecting portion is curved so as to pass through substantially a same radial position as the uniform-diameter portion of the expanding-contracting portion, as seen in the direction of the longitudinal axis.

4. The coil spring of claim 1, wherein the second portion of the connecting portion extends so as to radially traverse the valve support portion through a center of the support winding portion of the valve support portion, as seen in the direction of the longitudinal axis.

5. The coil spring of claim 1, wherein when the expanding-contracting portion is not compressed, the first portion abuts against the end winding portion of the expanding-contracting portion, and the second portion abuts against the support winding portion of the valve support portion, and further the third portion abuts against the at least one of the end winding portion and the first portion.

6. A valved flow path member comprising:
   a cylindrical body having the fluid passage;
   the valve element disposed in the fluid passage displaceably in the direction of the longitudinal axis of the fluid passage between the open position for opening the fluid passage and the closed position for closing the fluid passage; and
   the coil spring of claim 1, the coil spring being disposed in the fluid passage between the cylindrical body and the valve element.

7. A pipe coupling comprising a male coupling member and a female coupling member which are connectable to each other;

wherein one of the male coupling member and the female coupling member is the valved flow path member of claim 6; and wherein when the male coupling member and the female coupling member are connected to each other, the valve element is pressed into the open position by an other of the male coupling member and the female coupling member.

\* \* \* \* \*